United States Patent [19]

Habiger

[11] Patent Number: 4,548,071

[45] Date of Patent: Oct. 22, 1985

[54] DETERMINATION OF OIL SHALE YIELD FROM WELL LOG DATA

[75] Inventor: Robert M. Habiger, Bartlesville, Okla.

[73] Assignee: Phillips Petroleum Company, Bartlesville, Okla.

[21] Appl. No.: 528,690

[22] Filed: Sep. 1, 1983

[51] Int. Cl.$^4$ .................... E21B 49/00; G01V 1/40
[52] U.S. Cl. ................................. 73/152; 364/422
[58] Field of Search ..................... 73/152; 364/422

[56] References Cited

U.S. PATENT DOCUMENTS

| Re. 28,963 | 9/1976 | Fertl et al. | 73/152 |
|---|---|---|---|
| 2,207,281 | 7/1940 | Athy et al. | 181/0.5 |
| 2,214,674 | 9/1940 | Hayward | 255/1 |
| 3,638,484 | 2/1972 | Tixier | 73/152 |
| 4,245,313 | 1/1981 | Coates | 364/422 |
| 4,276,599 | 6/1981 | Timmons et al. | 364/422 |
| 4,314,339 | 2/1982 | Kenyon | 364/422 |
| 4,369,497 | 1/1983 | Poupon et al. | 73/152 |

OTHER PUBLICATIONS

Bardsley, S. R. and Algermissen, S. T., 1963, Evaluating Oil Shale by Log Analysis: Journal of Petroleum Technology, vol. 15, No. 1, pp. 81–84.

Smith, John Ward, 1956, Specific Gravity-Oil Yield Relationships of Two Oil Shale Cores: Industrial and Engineering Chemistry, vol. 48, No. 3, pp. 141–444.

Tixier M. P. and Alger, R. P., 1967, Log Evaluation of Nonmetallic Mineral Deposits: SPWLA Symposium, Paper R.

Primary Examiner—Howard A. Birmiel
Attorney, Agent, or Firm—French and Doescher

[57] ABSTRACT

Density and resistivity log are utilized to predict the amount of oil which could be produced from a specified volume of oil shale taken from an oil shale formation. Preferably, a sonic log is also utilized in such prediction.

5 Claims, 8 Drawing Figures

DETERMINATION OF OIL SHALE YIELD FROM WELL LOG DATA

This invention relates to measurement of the oil content of oil shale (oil shale yield). In one aspect, this invention relates to a method for determining the oil content of oil shale based on well log data.

Resource evaluation of oil shale formations requires a determination of the oil content of the oil shale or oil shale yield, i.e., the amount of oil which could be produced from a given amount of oil shale. A typical method of making a determination is to obtain core samples and perform a laboratory analysis to determine the amount of oil which could be recovered in a retorting operation from a given amount of the oil shale (this amount is typically referred to as the Modified Fischer Assay and the terms "oil shale yield" and Modified Fischer Assay are used interchangeably). Laboratory tests consists of taking a specified sample, such as 100 grams, heating the sample and catching the volatiles that are driven off. The volatiles are then condensed and the amount of oil is measured. Typically, the measurement is stated in gallons of oil per ton of oil shale. Again, this is a prediction of the amount of oil which could be recovered by a retorting operation from a ton of oil shale taken from a particular formation.

Obtaining core samples may be difficult in many circumstances and also the time and expense required for a laboratory analysis are detrimental factors to determining the Modified Fischer Assay by the above described laboratory tests. Efforts have thus been made to predict the Modified Fischer Assay using well log data. Typically, the density log is utilized to make the prediction. However, it has been found that the desired accuracy for the prediction cannot be obtained using a density log. Examples of this are presented in the prior art drawings.

Referring first to FIG. 1, yield in gallons of oil per ton of oil shale is plotted as a function of the density of the oil shale. Three different curves are shown which are reported by the three following references:

Bardsley, S. R. and Algermissen, S. T., 1963, Evaluating Oil Shale by Log Analysis: Journal of Petroleum Technology, Vol. 15, No. 1, pages 81–84;

Smith, John Ward, 1956, Specific Gravity-Oil Yield Relationships of Two Colorado Oil Shale Cores: Industrial and Engineering Chemistry, Vol. 48, No. 3, pages 441–444; and Tixier, M. P. and Alger, R. P., 1967, Log Evaluation of Nonmetallic Mineral Deposits: SPWLA Symposium, Paper R. As can be seen from FIG. 1, the results reported vary widely.

The reason for the variance illustrated in FIG. 1 is illustrated in FIG. 2. In FIG. 2, actual laboratory measurements of yield are plotted as function of density. Ideally, this plot would produce a very closely grouped series of points along a line. Obviously, this is not the case.

Also, as is illustrated in FIG. 3, the same type of results occur when actual laboratory measured yield is plotted as a function of the reciprocal of velocity which is obtained from a sonic log.

It is thus an object of this invention to provide a method for using well log data to determine the Modified Fischer Assay which overcomes the problems encountered by the prior art illustrated in FIG. 1.

In accordance with the present invention, a method is provided whereby a density and resistivity log are utilized to predict the Modified Fischer Assay for an oil shale formation. Preferably, a sonic log is also utilized in such prediction. Use of the plurality of logs results in a greatly improved accuracy of the prediction.

In general, when using the preferred method, the density log, resistivity log and sonic log are utilized to derive three variables. These three variables, which will be more fully described hereinafter, are a density variation (DV) the logarithm of the resistivity (Log R), and a clay index (CI). An actual analysis of core samples taken from a well where the log data from which the three variables were derived was taken is then utilized to develop an equation for predicting a Modified Fischer Assay by means of a linear regression analysis. This equation can then be used by substituting the three variables derived from log data for another well to predict the Modified Fischer Assay for the oil shale formation located at the second well with excellent accuracy.

Other objects and advantages of the invention will be apparent from the foregoing brief description of the invention and the claims as well as the detailed description of the drawings which have not been previously discussed. A brief description of all drawings is as follows:

Figure 1:
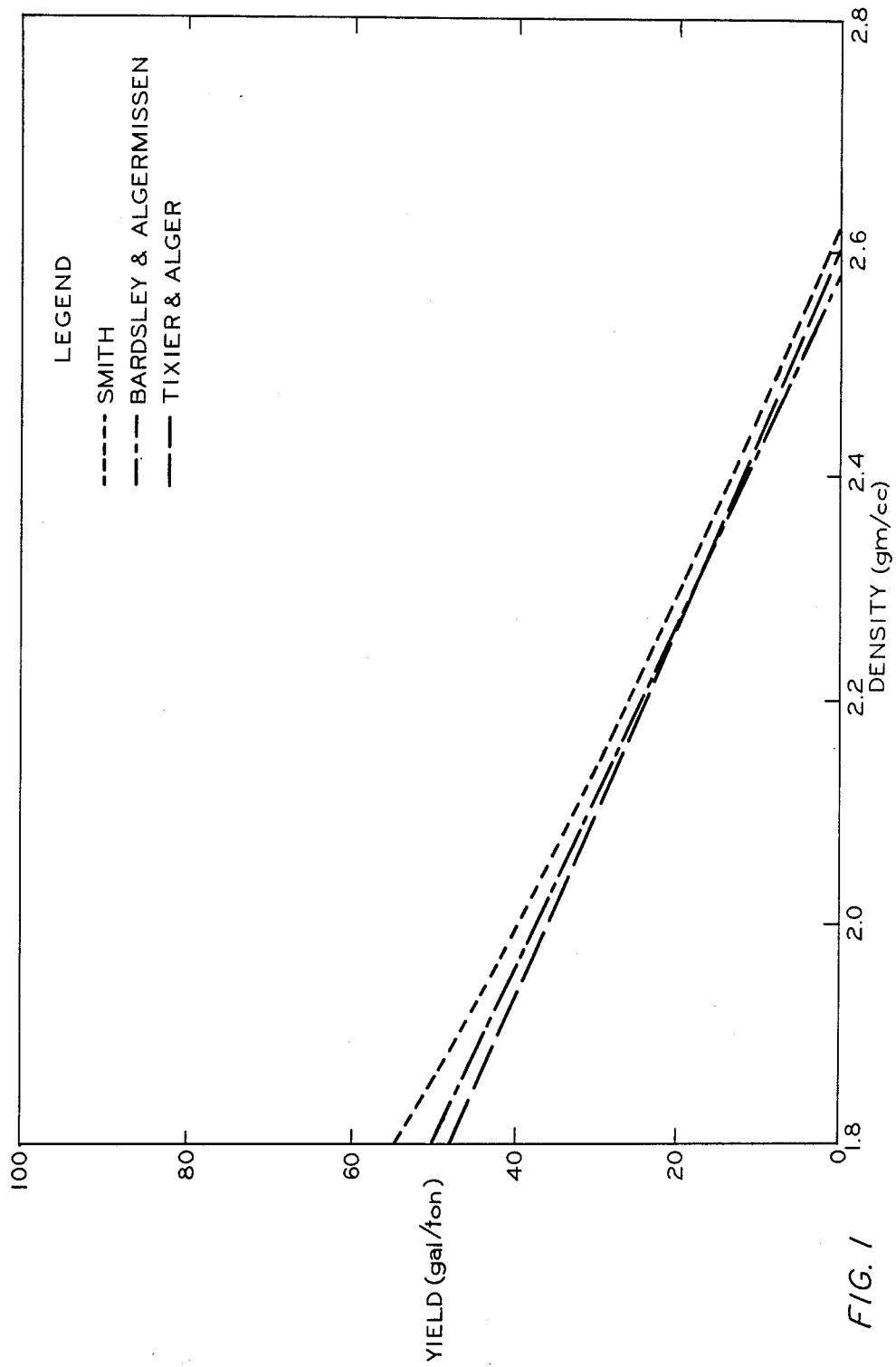
FIG. 1 is a comparison of the results reported by three references for using a density log to determine yield.
Figure 2:
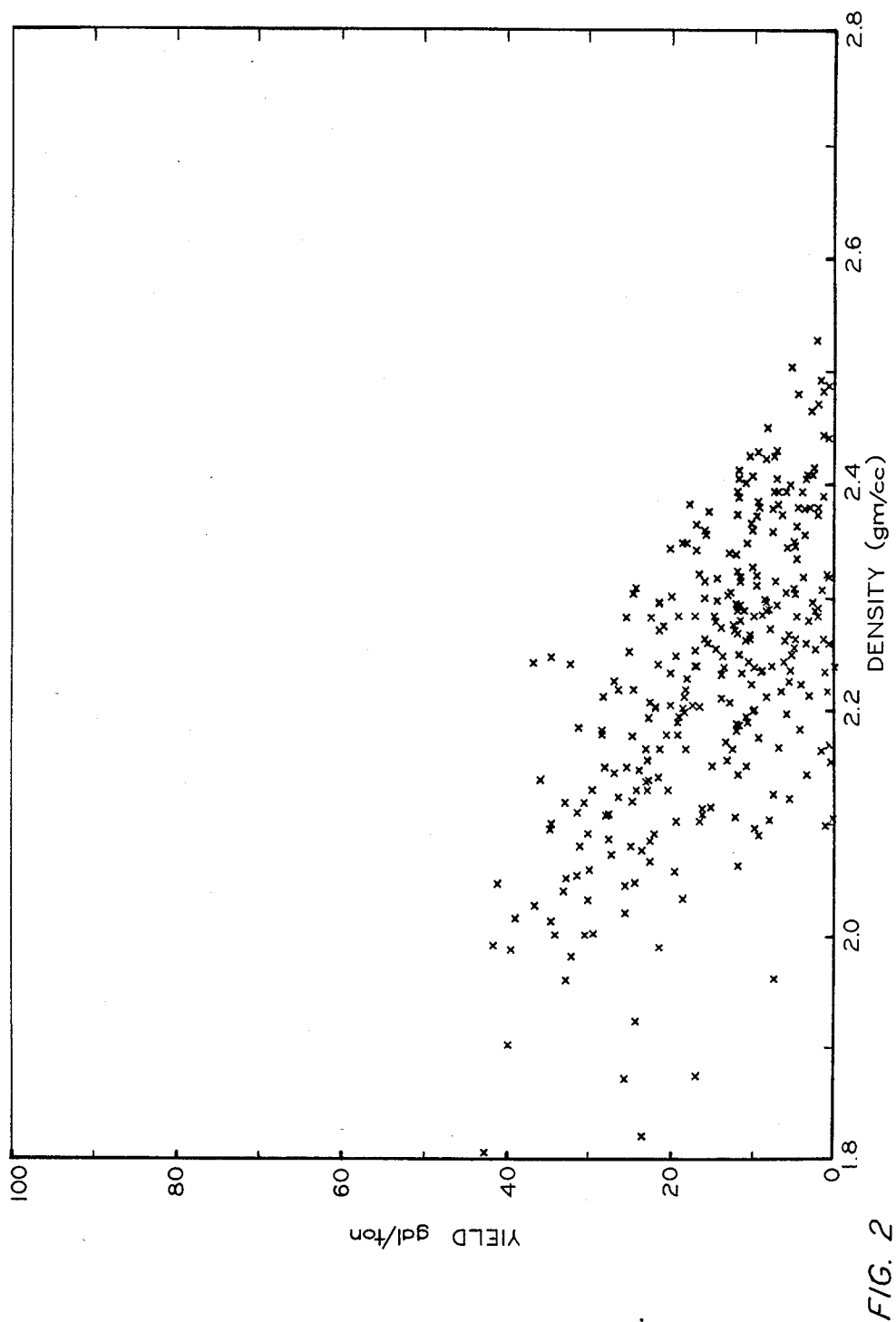
FIG. 2 is a plot of yield from actual laboratory measurements plotted as a function of density from a density well log.
Figure 3:
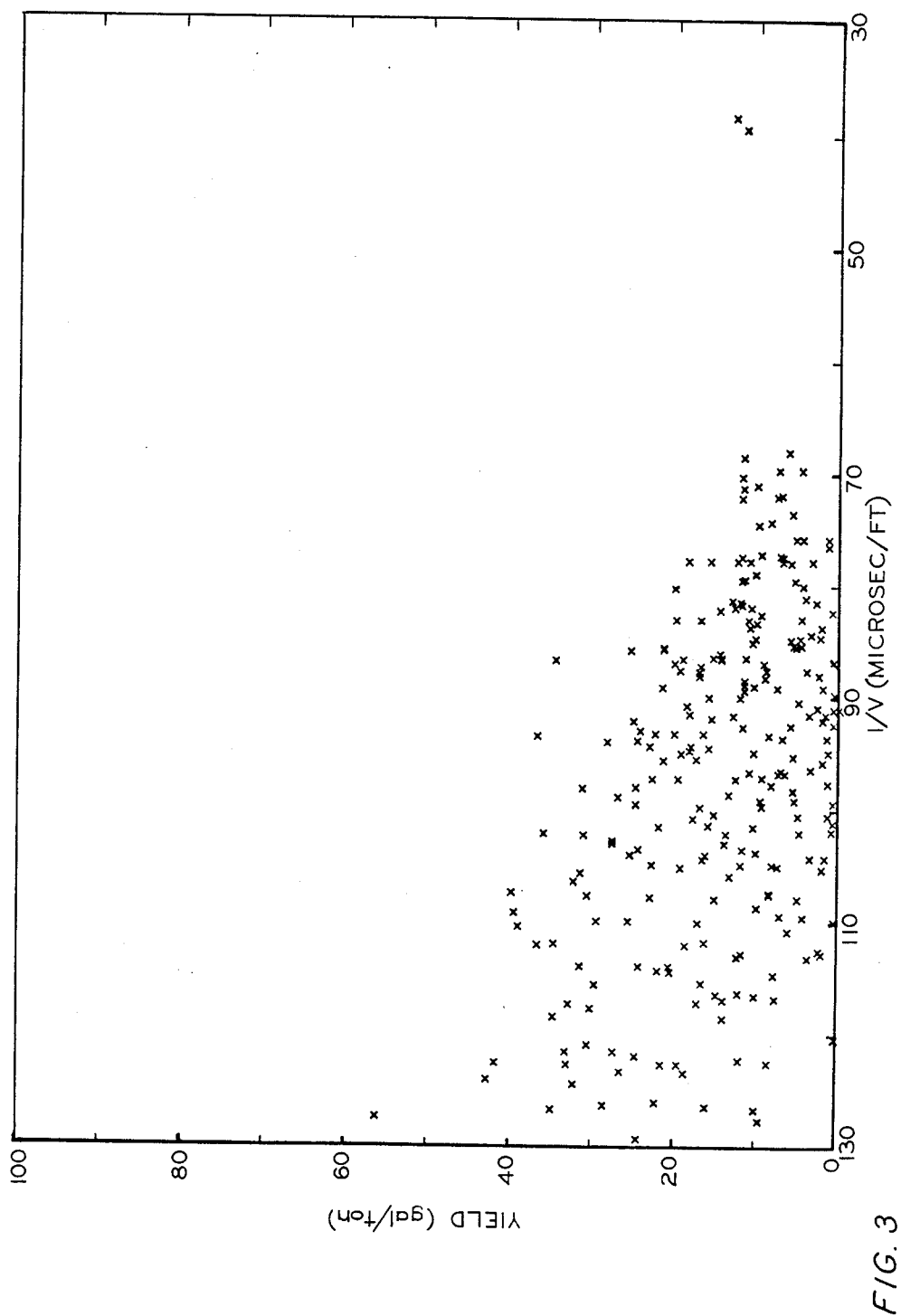
FIG. 3 is a plot of yield as actually measured in a laboratory as a function of the reciprocal of velocity obtained from a sonic well log.

The invention is described in terms of the use of a density log, resistivity and sonic log. Each of these logs are well known and will be described only briefly hereinafter.

A density log measures the bulk density of a formation. Typically, a source of gamma rays is included in the well logging tool and a detector for gamma rays. Gamma rays are injected into the formation and the number of gamma rays detected is related to scattering. Scattering is related to electron density and the electron density is related to bulk density. Thus, a measurement of bulk density can be obtained by detecting gamma rays injected into a formation.

A sonic log is utilized to measure compressional velocity. A source of compressional waves is utilized in the well logging tool as well as a receiver. The time required for the wave to travel from the source to the receiver, which will be a known distance, is utilized to determine the compressional velocity.

A resistivity log is utilized to determine the resistivity of a formation. An electrical current is driven through the formation and is utilized to measure the resistivity. A resistivity measurement responds primarily to conductive fluids contained in the formation.

The manner in which these three logs are utilized to derive the variables used in the linear regression analysis is described hereinafter.

The actual density of the oil shale formation as determined from the density log can be utilized directly as a variable. However, it is preferred to utilize a variable which will be referred to herein as the density variation (DV) because the density log varies from hole to hole more than would be expected based on changes in organic content. The density variation is given by Equation (1):

$$DV = (density) - (density\ mean) \quad (1)$$

where
 density = the actual density at a particular position in a bore hole; and
 density mean = the average density for an entire bore hole as determined from averaging the densities obtained from a density log of a bore hole.

The results of the resistivity log can also be used directly in the regression analysis but it is preferred to use the logarithm of the resistivity because the relationship between resistivity and oil shale yield is generally logarithmic and not linear. In contrast, the density variation and the clay index (CI) have a linear relationship to oil shale yield. The use of the resistivity measurement directly would thus make the regression analysis more difficult because one variable would be logarithmic with respect to oil shale yield while the other variables would be linear. Thus, preferably, the logarithm of resistivity (log R) is the second variable used in the regression analysis.

Figure 4:
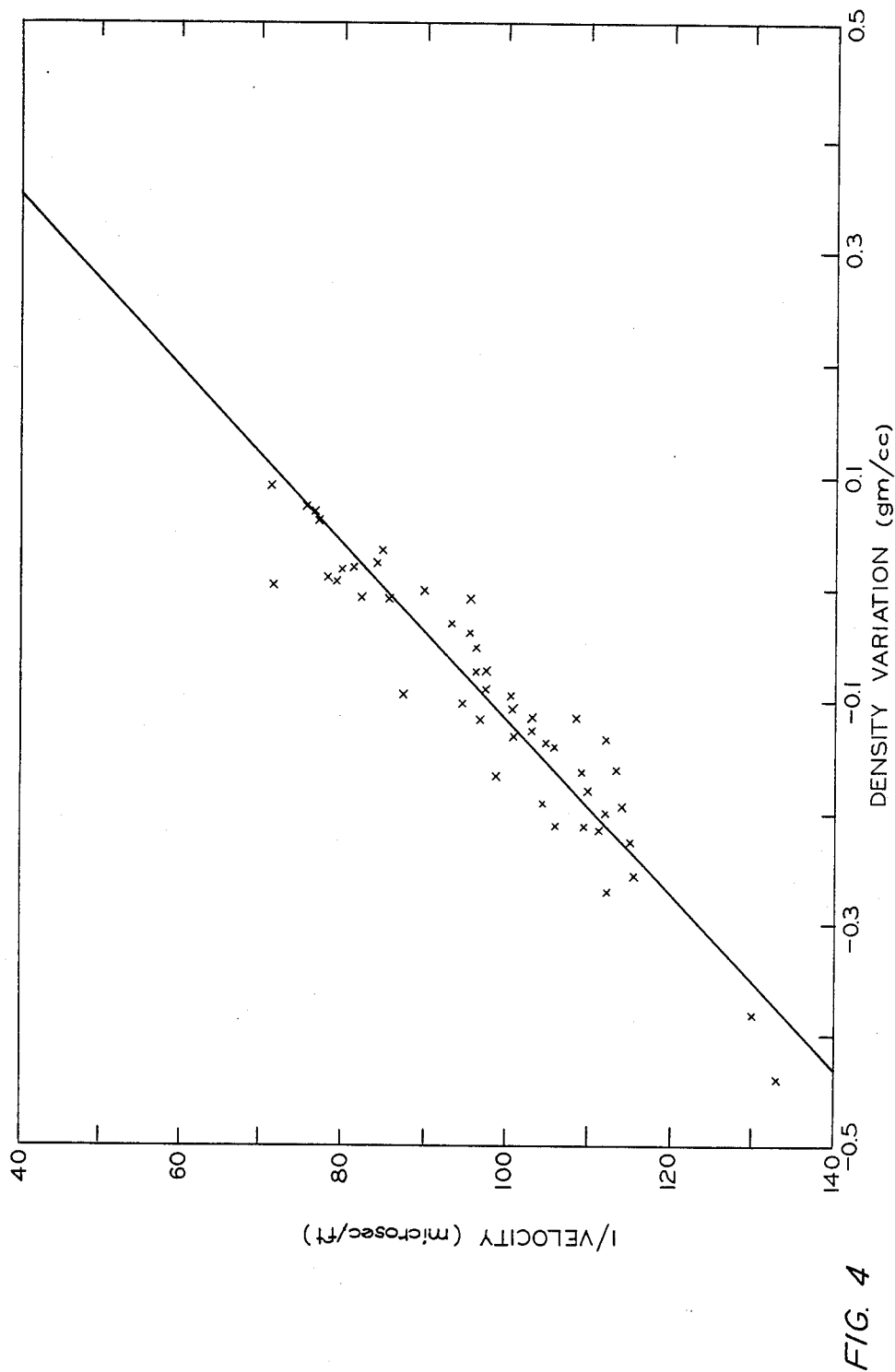
FIG. 4 is a plot of the reciprocal of velocity as a function of density variation (DV) for a portion of an oil shale formation which did not have a significant clay concentration.

It has been found that the clay content of the shale oil has a significant effect on predicting the oil shale yield or Modified Fischer Assay for the oil shale. A clay index was thus developed based on the sonic log and the density log. The manner in which the clay index for any particular well is determined is as follows:

Referring now to FIG. 4, a plot of the reciprocal of velocity as obtained from a sonic log as a function of density variation (DV) as obtained from a density log is illustrated. The data plotted for a portion of a formation which had little clay. A straight line fit is utilized to determine the relationship between the reciprocal of velocity and density variation where little clay is present.

Figure 5:
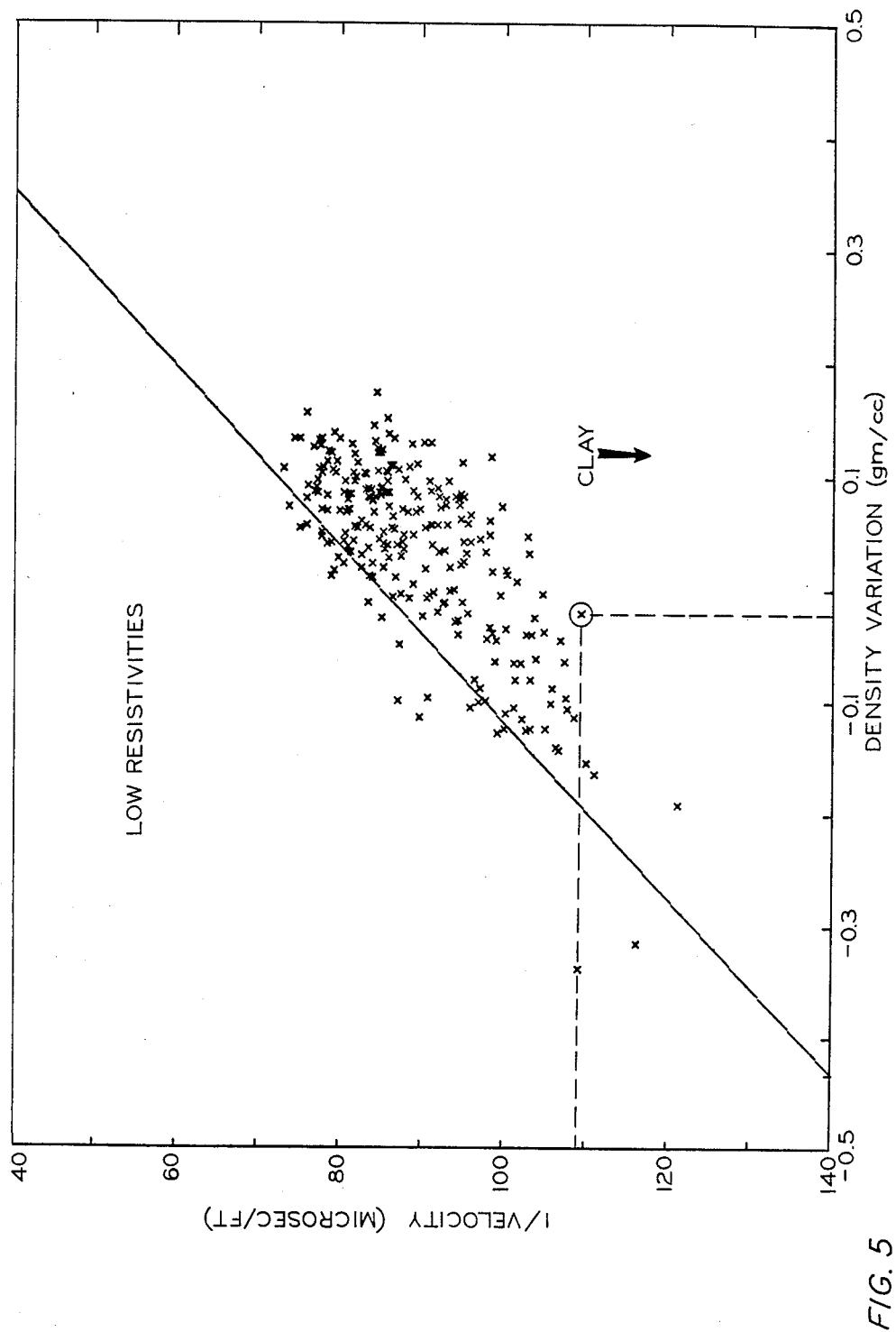
FIG. 5 is a plot of the reciprocal of velocity as a function of density variation (DV) for a portion of an oil shale formation which had a significant clay concentration.

FIG. 5 illustrates a plot such as that illustrated in FIG. 4 with the exception that clay is present. The line illustrated in FIG. 5 is the same line as determined in FIG. 4. The points significantly below the line are believed to be affected by the presence of clay. The clay index is derived by determining the amount that a particular data point is offset from the line. For the data illustrated in FIGS. 4 and 5, the clay index (CI) is given by Equation 2.

$$CI = 1/velocity + 127.31(DV) - 84.84 \quad (2)$$

Equation (2) is derived from the slope intercept form of the line illustrated in FIGS. 4 and 5.

As an example of the use of Equation (2), consider the data point circled in FIG. 5. DV for this data point is approximately $-0.025$ while 1/velocity is approximately 109. Substituting these values into Equation (2) gives a CI of 20.98. An examination of FIG. 5 shows that this is indeed the distance between the circled data point and the line as measured on the 1/velocity axis.

Once the variables DV, log R and CI are determined for a particular formation, a linear regression is utilized to determine an equation which can be utilized to predict the modified Fisher assay for shale oil in the formation. The equation will have the form of Equation (3).

$$Y = (A_1)(DV) + (A_2)(log\ R) + (A_3)(CI) + A_4 \quad (3)$$

where a $A_1$, $A_2$, $A_3$, and $A_4$ are constants.

To determine the values of the constants $A_1$–$A_4$, a plurality of yields as determined from laboratory analysis is substituted for Y and the values DV, log R and CI for the particular oil shale which produced each measured yield are substituted into Equation (3). A standard linear regression is then performed to determine the values of $A_1$–$A_4$ which will provide the closest fit in predicting yield based only on log data. Once these constants are determined, Equation (3) can be utilized to predict yield for an oil shale formation where no laboratory data is available but log data is available.

As has been previously stated, the clay index may not be required if a significant amount of clay is present or substantially no clay is present such that a small change in clay content will not affect the predicted yield. This is illustrated in the following description of an actual determination of Equation (3).

Figure 6:
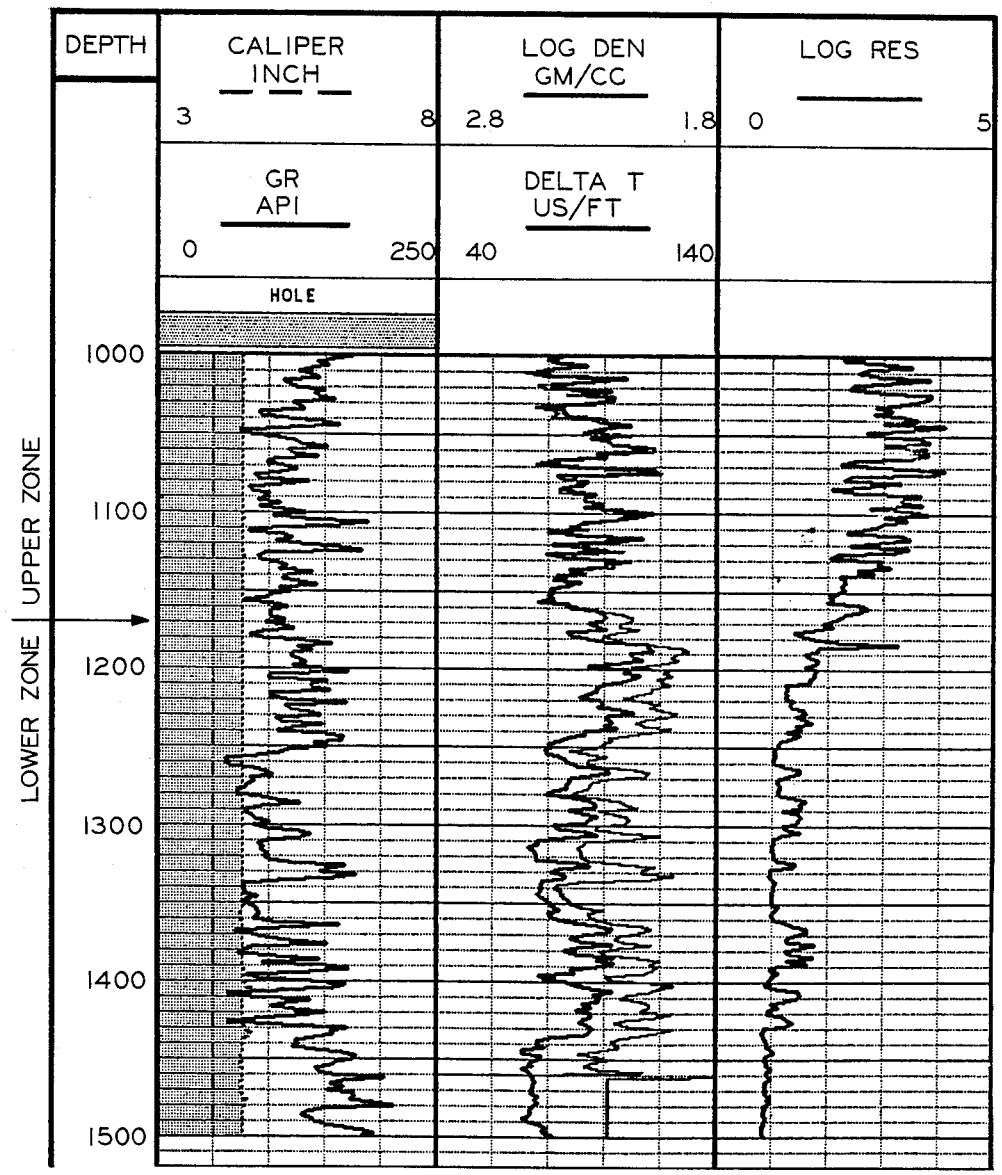
FIG. 6 is an actual caliper log, density log, sonic log, and resistivity log for a bore hole in an oil shale formation.

Referring now to FIG. 6, a caliper log, density log, sonic log and resistivity log are illustrated. The density log and sonic log are superimposed for the purposes of illustration. The density log, sonic log and resistivity log are the logs of interest.

Referring first to the density log and sonic log, it can be seen that in the portion of the log labeled upper zone, these two logs are essentially superimposed. However, in the lower zone, there is a definite separation between the density log and the sonic log. Also, in the resistivity log, it can be seen that a significant change in resistivity occurs between the upper zone and lower zone. It is believed that both the separation between the density log and the sonic log in the lower zone and the lower resistivities exhibited in the lower zone are caused by the presence of large amounts of clay in the lower zone.

Using actual data, a yield equation determined for the upper zone illustrated in FIG. 6 is given by Equation (4).

$$Y = (-74.37)(DV) + 7.86(log\ R) + (0.5)(CI) - 9.65. \quad (4)$$

In like manner, the yield equation determined for the lower zone is given by Equation (5).

$$Y = (-81.58)(DV) + (4.70)(log\ R) + 9.36 \quad (5)$$

A comparison of Equations (4) and (5) shows that the clay index was not required to give a good yield equation for the lower zone. It is believed the clay index was not required for the lower zone because there was a high concentration of clay in the lower zone and thus small changes in clay concentration had little effect on the prediction of yield. However, where there are low concentrations of clay, small changes will have a substantial impact on the yield prediction. It is noted that the clay index may be used where there is a high concentration of clay with no detrimental effect.

Figure 7:
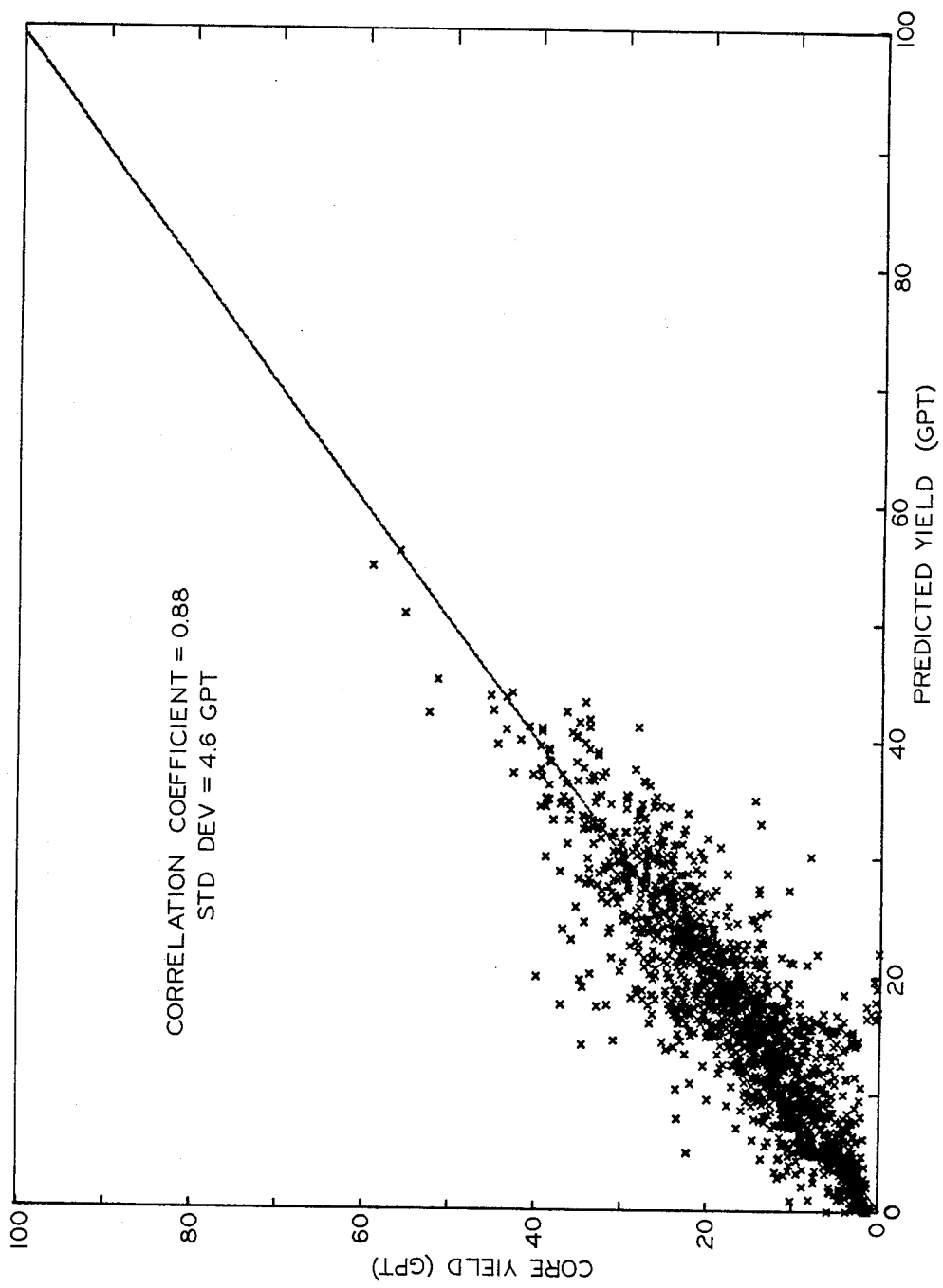
FIG. 7 is a plot of core yield as determined by a laboratory analysis as a function of the yield predicted in accordance with the present invention.

Using the yield Equations (4) and (5), a predicted yield was compared to a laboratory measured yield. The result of this comparison are illustrated in FIG. 7 where the core yield as measured by laboratory analysis is compared to the predicted yield where both factors are in gallons per ton. The correlation coefficient was 0.88 and the standard deviation was 4.6 gallons per ton which is an excellent comparison between the laboratory measurements and the prediction based on log data.

Figure 8:
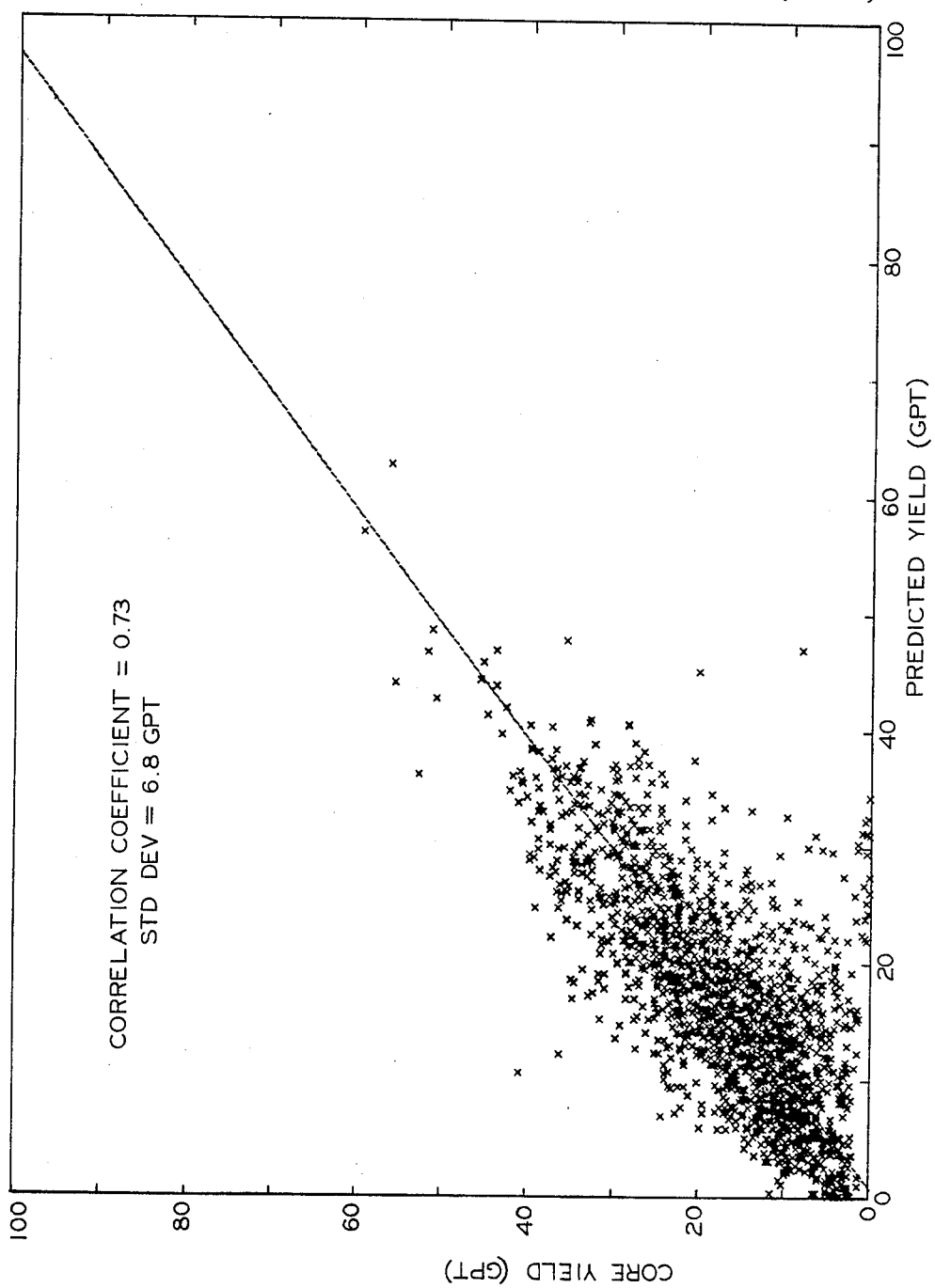
FIG. 8 is a plot of core yield as determined from actual laboratory analysis as a function of the yield predicted based only on a density log.

As a comparison, the core yield as determined by laboratory analysis was compared to a predicted yield based only on a density log. The result of this comparison are set forth in FIG. 8. For FIG. 8, the correlation coefficient was 0.73 and the standard deviation was 6.8 gallons per ton which is significantly higher than that illustrated in FIG. 7. This further illustrates the advantages of the present invention.

In summary, the results of a density log and resistivity log and also preferably a sonic log are utilized to predict the amount of oil which could be produced from a unit volume of oil shale. It has been found that the use of this plurality of logs provides a beneficial result with respect to methods previously used and provides an excellent correlation between predicted yield and actual yield.

The present invention has been described in terms of a preferred embodiment. Reasonable variations are possible by those skilled in the art and such variations are within the scope of the present invention, as claimed.

That which is claimed is:

1. A method for predicting the amount of oil which can be produced from a given volume of oil shale taken from an oil shale formation at a first location comprising the steps of:
   (a) determining the density of the oil shale at said first location (density) from density log data taken at said first location in a bore hole which traverses said oil shale formation;
   (b) determining the magnitude of a first variable based on the density determined in step (a);
   (c) determining the resistivity of the oil shale at said first location (R) from a resistivity log taken at said first location in said bore hole;
   (d) taking the logarithm of the resistivity determined in step (c) to establish a second variable (log R);
   (e) predicting the amount of oil which could be produced from a specified volume of oil shale taken from said first location based on said first variable and said second variable.

2. A method in accordance with claim 1 additionally comprising the steps of:
   determining the magnitude of a third variable based on said density log data taken at said first location and sonic log data taken at said first location; and
   using said third variable in addition to said first variable and said second variable to predict the amount of oil which could be produced from a specified volume of oil shale taken from said first location.

3. A method in accordance with claim 2 wherein said step of determining the magnitude of said first variable comprises the steps of:
   determining the average density for said oil shale formation traversed by said bore hole (density mean) based on density log data for said bore hole; and
   determining the magnitude of said first variable (DV) at said first location in accordance with Equation (1)

$$DV = (\text{density}) - (\text{density mean}). \quad (1)$$

4. A method in accordance with claim 3 wherein said step of determining the magnitude of said third variable in response to sonic log data taken at said first location and density log data taken at said first location comprises the steps of:
   plotting the reciprocal of velocity as a function of DV for a portion of said oil shale formation traversed by said bore hole which does not contain a significant concentration of clay to establish a relationship between the reciprocal of velocity and DV for said portion of said oil shale formation which does not contain a significant concentration of clay;
   plotting the reciprocal of velocity as a function of DV for a portion of said oil shale formation traversed by said bore hole which does contain a significant concentration of clay; and
   determining said third variable (CI) based on said relationship established using said first plot and based on said second plot.

5. A method in accordance with claim 4 wherein said step of predicting the amount of oil which could be produced from a given volume of oil shale taken from said oil shale formation at said first location comprises the steps of:
   establishing an equation having the form of Equation (2)

$$Y = (A_1)(DV) + (A_2)(\log R) + (A_3)(CI) + A_4; \quad (2)$$

determining the values of the constants $A_1$, $A_2$, $A_3$ and $A_4$ based on actual measured yields and a linear regression analysis; and
using the determined values of $A_1$, $A_2$, $A_3$ and $A_4$ and the actual values of DV, log R and CI for said first location to predict the amount of oil which could be produced from a given volume of oil shale taken from said oil shale formation at said first location.

* * * * *